(12) United States Patent
Yuzhang

(10) Patent No.: US 7,860,080 B2
(45) Date of Patent: Dec. 28, 2010

(54) SERVICE PROVISIONING IN TELECOMMUNICATIONS SYSTEM COMPRISING CALL CONTROL SERVICE CAPABILITY SERVERS

(75) Inventor: Liu Yuzhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1671 days.

(21) Appl. No.: 10/506,747

(22) PCT Filed: Mar. 6, 2002

(86) PCT No.: PCT/EP02/02462

§ 371 (c)(1),
(2), (4) Date: Sep. 3, 2004

(87) PCT Pub. No.: WO03/075582

PCT Pub. Date: Sep. 12, 2003

(65) Prior Publication Data

US 2005/0108321 A1    May 19, 2005

(51) Int. Cl.
H04L 12/66 (2006.01)
G06F 15/16 (2006.01)
H04M 3/42 (2006.01)

(52) U.S. Cl. .................. 370/352; 379/202.01; 709/203
(58) Field of Classification Search ............... 379/207, 379/207.02, 207.01; 370/352, 401, 328, 370/338, 465; 709/203
See application file for complete search history.

(56) References Cited

U.S. PATENT DOCUMENTS 6,148,069 A * 11/2000 Ekstrom et al. ........ 379/221.08
6,683,868 B1 * 1/2004 Couturier ................... 370/352
6,788,667 B1 * 9/2004 Beresin ...................... 370/338
2002/0176379 A1 * 11/2002 Wallenius et al. ........... 370/328
2003/0095566 A1 * 5/2003 Bunting et al. .............. 370/465

FOREIGN PATENT DOCUMENTS

| EP | 0722257 | 7/1996 |
| EP | 0722257 A | 7/1996 |
| WO | WO 0188739 | 11/2001 |
| WO | WO 0188739 A | 11/2001 |

OTHER PUBLICATIONS

ETSI, Universal Mobile Telecommunications System (UMTS); Virtual Home Environment/Open Service Architecture: 3GPP TS 23.127 version 4.2.0 Release 4, Jun. 2001, pp. 8-10.*
Grech and Unmehopa, Using Open Service Access to Enable Mobile Internet Applications in UMTS Networks. Mar. 26-28, 2001, IEE- 3G Mobile Communications Technology, Conference Publication No. 477, pp. 341-343.*
Stretch, R M, The OSI API and other related issues, Jan. 1, 2001, BT Technology Journal, vol. 19, p. 80-87.*
European Patent Office, International Search Report for PCT/EP02/02462, dated Oct. 17, 2002.

* cited by examiner

Primary Examiner—Ahmad F Matar
Assistant Examiner—Sonia Gay

(57) ABSTRACT

This invention describes a method of service provisioning in a telecommunication system, which telecommunication system is comprised of configurations of service switching point (SSP), service capability server (SCS) and service provisioning equipment, which configurations are configured to provide services to users, wherein the provisioning of at least one of said services requires the involvement of more than one service capability server. To set up the service, a direct interaction between the service capability servers is provided.

13 Claims, 2 Drawing Sheets

SERVICE PROVISIONING IN TELECOMMUNICATIONS SYSTEM COMPRISING CALL CONTROL SERVICE CAPABILITY SERVERS

FIELD OF THE INVENTION

The present invention relates generally to service provisioning in a telecommunications system, and more specifically, to a method of service provisioning in a telecommunications system, which telecommunications system is comprised of configurations of service switching point (SSP), service capability server (SCS) and service provisioning equipment, which configurations are configured to provide services to users, wherein the provisioning of at least one of said services requires the involvement of more than one service capability server.

BACKGROUND OF THE INVENTION

A method as described above is disclosed in International Patent Application nr. WO 01/88739, describing a personal service environment manager (PSEM). The document describes an open service architecture (OSA) comprising service capabilities servers and service provisioning servers or application servers. The document further describes the underlying network technology consisting of service switching points, and the setting up of services through one or more service capability servers interacting with the service provisioning servers or application servers.

The number of services that can be offered over telecommunications networks and the integration of the services within modern society has increased rapidly over the past decennia. Services are becoming more and more sophisticated, and can be accessed by any user from any location at any point in time. The introduction of the universal mobile telecommunications system (UMTS) has accelerated this development even more.

In general, in a telecommunications system, services are offered over the network using service capability servers (SCS). These service capability servers are responsible for management of the service and the telecommunications infrastructure required to provide that service. In the hierarchy below the service capability servers, the telecommunications infrastructure is comprised of service switching points (SSP), which are interconnected with each other. Service provisioning equipment, such as media servers, and user equipment, like a telephone set or a mobile phone, also connects to the service switching points.

In recent years, UMTS has triggered the development of the so-called open service architecture (OSA), in which service providers can easily incorporate the services offered by a third party into there own service without having to reveal this to their customers. The customer will only deal with one provider from which he receives support, and which provider sends him one bill for all the services used. The use of this principle is not limited to UMTS. Those skilled in the art will appreciate that similar methods can be used in any telecommunications system.

According to the open service architecture principle the user calls, for instance, to an application server, and accesses an application that provides the user with a choice of services. These services could be voice mail service, fax service, IP services, multi media, etc. As explained above, the provisioning of services itself over the telecommunications infrastructure is managed by service capability servers, and this is also the case for applications on an application server, which is accessed by users.

As more complicated services are made up of interactions on different levels of communications, call control, user interaction, etc, each service capability (level/type of communication) may be handled by a different service capability server. A number of these service capability servers may be operated from the same location on the network, e.g. being part of a framework, but in some cases in order to offer a service a plurality of service capability servers are used from different locations.

It is best to consider an example to illustrate this principle. Take for example the user calling into an application. First, the connection between the user and the application will be set up by a call control service capability server. As soon as this connection has been established the application will, for example, start a security authentication procedure. This security authentication procedure may consist of a digitised voice message after which the user can enter his pin code via dual tone multi-frequencies (DTMF) on the keyboard of his telephone set. Suppose however that the authentication procedure will not be handled by the application itself, but by a remote media server. In order to perform this action, the application needs to contact a remote user interaction service capability server. This service capability server may be in a different location than the service capability server that has established the call between the application and the user. The application knows exactly which service capability server to contact in order to start the authentication procedure. Ideally the application only temporarily transfers the call to the media server, responsible for carrying out the security authentication procedure, and take back the call after the procedure has ended. The transfer of a call is handled, as mentioned, by the call control service capability server. The problem is that the user interaction service capability server knows where the media server is, and the call control server, handling all details of the user call, needs to transfer the call whilst maintaining contact to the application. In this case an extra speech channel needs to be set up between the service switching point and the media server.

In an existing solution, the location details of the media server are offered by the user interaction service capability server to the application, and the application, on his turn, forwards this information to the call control service capability server. Upon receiving this information the call control service capability server instructs the service switching point to open a speech channel to the media server as it now knows where this media server is located.

The major issue with this solution is that the application is involved in the management of the telecommunication services, while in principle, the underlaying telecommunications infrastructure needs to be transparent to the application, as well as to the user.

SUMMARY OF THE INVENTION

It is an object of the present invention to provide a solution to the management of a telecommunications infrastructure in case a service is offered by an application in an open service architecture, which service requires the involvement of more than one service capability server.

In addition, the solution offered needs to be transparent to both the application offering the service, as well as the user requesting the service.

According to the present invention management of the telecommunications infrastructure is controlled via direct interaction between the service capability servers involved in the provisioning of service. In particular this means that, for instance in the example described above, upon receiving instructions from the application, the user interaction service capability server forwards the location of the media server directly to the call control service capability server handling the call between the user and the application (and not to the application).

In order to enable this a protocol and instructions need to be defined as the language between the service capability servers. Naturally, these instructions would comprise instructions for setting up a connection, as well as for terminating connections, and instructions for the exchange of specific information required to control the telecommunications infrastructure.

A method for the provisioning of services in a telecommunications system according to the invention, comprised of an application server, service capability servers, service switching points and service provisioning equipment, such as a media server, is described below. It will be comprised of the steps of accessing the application, requesting a user interaction sequence, preparing of the telecommunications infrastructure, the user interaction itself, and closing all connections made except for the call between the user and the application.

The procedure starts by an incoming call, from the service switching point to the call control service capability server, which call will be passed on by the service capability server to the application running on the application server. Here, a user interaction is required, for example the security authentication, and the application will contact the user interaction service capability server and forward the user interaction request.

The user interaction service capability server, upon receiving the user interaction request, will instruct the media server to reserve a communications port over which the user interaction can be performed. It will then contact the call control service capability server, and inform the call control service capability server of the location of the media server, and instruct the call control service capability server to establish a connection between the service switching point and the media server. The call control service capability server will then instruct the service switching point to set up a, for instance, speech channel between the service switching point and the media server, informing the service switching point of the reserved communication ports on the media server that can be used to establish the connection. After this the speech channel will be set up and the media server will acknowledge to the user interaction service capability server that a connection has been established between the media server and the service switching point.

The user interaction service capability server will now forward the user interaction request to the media server which, on his turn, carries out the user interaction sequence. This sequence could be the playing of a digitalised message or a sound, the input of a pin code or a choice by the user, or a simular interaction. The result of that user interaction sequence will be send by the media server to the user interaction service capability server, which user interaction service capability server can forward this information to the application.

The procedure will end after the application instructs the user interaction service capability server that the required information has been received and that his services are no longer required. The user interaction service capability server will instruct the call control service capability server to terminate the connection between the service switching point and the media server. An instruction will be passed on from the call control service capability server to the service switching point to terminate the connection. In the mean time the connection between the user and the application via the call control service capability server will remain, so that after transferring the call back to the application the interaction between the user and the application can be continued.

The above-mentioned and other features and advantages of the invention are illustrated in the following description of a preferred embodiment of the present invention in a UMTS environment, with reference to the enclosed drawings. The present invention, described hereinafter, will be likewise applicable to any telecommunications system which is comprised service switching points, service capability servers and service provisioning equipment, such as but not limited to 2G and 3G mobile telecommunications systems, like CDMA 2000.

DETAILED DESCRIPTION OF THE EMBODIMENTS

Figure 1:
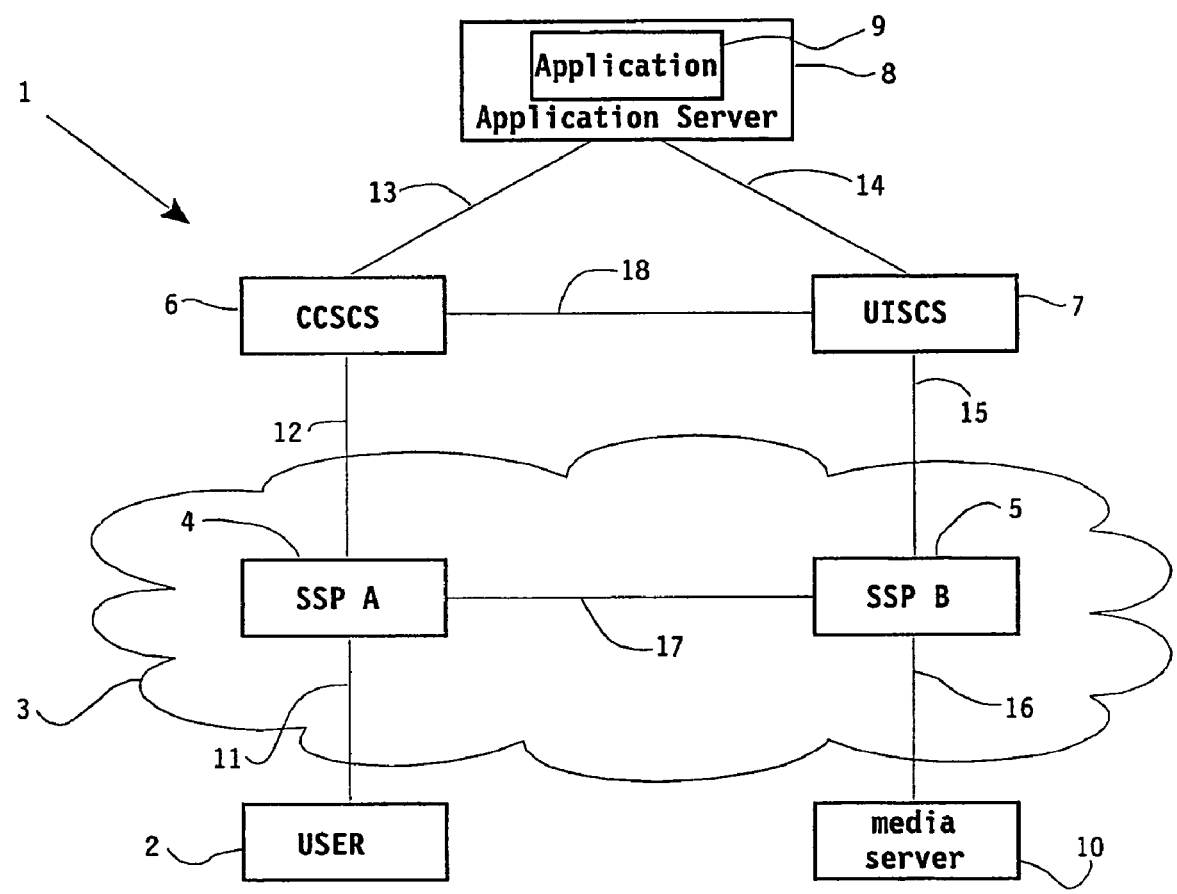
FIG. 1 shows a configuration of telecommunications equipment to which a method according to the invention may be applied.

FIG. 1 shows an arrangement 1 for the provisioning of telecommunications services which is comprised of a configuration of service switching points 4 and 5, service capability servers 6 and 7, an application server 8 running an application 9, a user 2 and a media server 10. The elements of the configuration are interconnected by communication links 11-18.

The basis of this arrangement is a telecommunications network 3 which is comprised of service switching point A 4 and service switching point B 5 and a number of interconnections (amongst which interconnection 11, 12, 15, 16, 17). Note that interconnection 18, between call control service capability server 6 and user interaction service capability server 7, is not necessarily a physical direct connection but could be virtual direct, in case user interaction service capability server 7 is in a different location than call control service capability server 6. By virtual direct, it is meant here that the communication of instructions is direct between both service capability servers, rather than the presence of a direct physical connection, such as a cable. Interconnection 18, in this latter case, would be part of telecommunications network 3 as well. The same holds for interconnections 13 and 14. Note therefor, that the configuration as shown in FIG. 1 also illustrates the hierarchy of the configuration.

The arrangement 1 in FIG. 1 is configured to provide services to a user 2, which user 2 can access these services through one single application 9. The arrangement 1 could, for instance, be used within an open service architecture (OSA) in a universal mobile telecommunication system (UMTS), wherein providers can offer services of third parties, while these third parties may be transparent to the user 2. This clarifies the hierarchy as shown in FIG. 1. The application 9, being in charge of all other services, is the upper most element of the configuration in the figure. Just below this the service capability servers 6 and 7, are in charge of management of the telecommunications network 3, each one individually for the provisioning of a single type of service capability. The call control service capability 6 determines where and how the call is routed in a network, whilst the user interaction service capability server 7 manages the operational steps carried out to provide a certain user interaction.

The switching on the network, the actual work required to enable the data flow, is carried out by the service switching points 4 and 5. These service switching points are therefor in the hierarchy just below the service capability servers.

Below the service switching points A and B (4, 5), are the end points of the data flow. On one end this is the user 2, and on the other end this is the media server 10 being the source of the service.

In an ideal case, the application 9 and the application server 8 should not be aware of the telecommunications network 3. The application 9 and the application server 8 only need to know the locations of the call control service capability server 6 and the user interaction service capability server 7. The call control service capability server 6 should be aware of the telecommunications network 3 and as such the service switching point A 4 and B 5. The user interaction service capability server 7 only needs to know the source of the service or data which is in our case the media server 10. In general the user interaction service capability server is not even aware of the switching being done between himself and the media server 10, i.e. to the user interaction service capability server 7 there will be a virtual connection between the user interaction service capability server 7 and the media server 10. The user 2 should only be aware of the location of the application server 8, i.e. the user 2 will, for instance, call a telephone number, and is automatically connected to the application 9 running on the application server 8. Service switching points A 4 and B 5 are not aware of any other elements in the telecommunications system, as the service switching points (4, 5) will receive the necessary information from the elements that contact the service switching points (user 2, call control service capability server 6, etc). The media server 10 is a passive element from a telecommunications point of view. In this preferred embodiment the media server 10 only responds to requests by other elements, such as the user interaction service capability server 7, in the network.

According to the present invention the interaction between the user interaction service capability server 7, and the call control service capability server 6, is a direct interaction that will be communicated over communication link 18. In prior art, the application 9 and the application server 8 were involved in this interaction, and thus the interaction was indirect. As a result, the telecommunications infrastructure was not transparent to the application 9 and the application server 8 as they were involved in the management of the telecommunications infrastructure.

Figure 2:
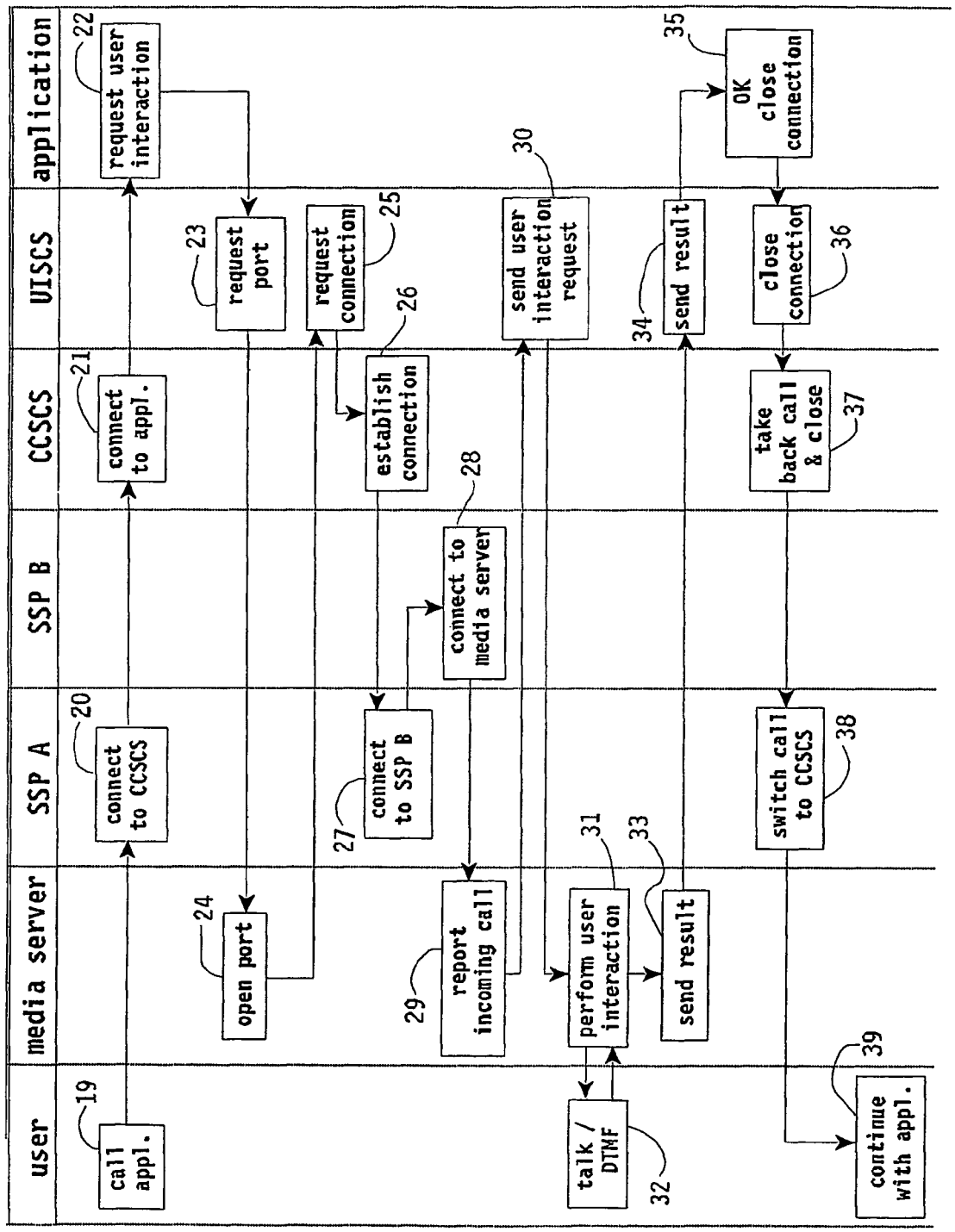
FIG. 2 shows a process flow diagram, with reference to the elements of FIG. 1, according to the invention.

In FIG. 2 a process flow diagram is shown according to the present invention. The process flow diagram shows a method of providing, for instance, a security authentication procedure to the user, before the user can access any other services on the application server. In this case the security authentication procedure is performed by a media server which has access to the security information of said user. This media server is shown in FIG. 1 as media server 10, and is in a different location then the application server, shown in FIG. 1 as application server 8. The present invention relates to the provisioning of any service that requires more than one service capability server, which service capability servers are logically or physically separated. In this case the user interaction service capability server would be located near the media server, and a virtual connection exists between the user interaction service capability server 7 and the media server 10 of FIG. 1.

The process starts by the user making a call to the application in step 19. The call comes into a service switching point A which connects 20 the call to a call control service capability server, and the call control service capability server will connect 21 the call to the application. The application will send a user interaction request 22 to the user interaction service capability server, in this case the user interaction request will be a request for security authentication. The user interaction service capability server will, on his turn, request a communication port to be reserved 23 on the media server. The media server will open the port 24 and inform the user interaction service capability server. Than the user interaction service capability server will request the connection 25 to be set up between the user and the media server. In step 25 it will inform the call control service capability server of the location details of the media server, so that the connection can be set up. The call control service capability server will establish the connection 26 by sending an instruction to service switching point A and service switching point B. Service switching point A will connect 27 to service switching point B, and service switching point B will connect 28 to the media server. The media server will receive an incoming call and report this 20 to the user interaction service capability server. The user interaction service capability server will send the user interaction request 30 that he has received from the application in step 22 to the media server. The user interaction will be performed between the media server and the user (31, 32) in this case the media server could for instance play a digitised voice message, and the user could key in his pin code via dual tone multi-frequency, or maybe just say his pin code which is analysed by a voice analysis system on the media server. The results of the user interaction will be send to the user interaction service capability server, which will forward 34 the result to the application. As soon as the application has received the results correctly, it will instruct the user interaction service capability server to close the connection 35. The user interaction service capability server will instruct the call control service capability server to close the connection 36, upon which the call control service capability server will take back the call 37 (so that the user is again connected to the application), and close the connection to the media server, in step 37. The service switching point upon receiving the instructions from the call control service capability server will switch back the call 38 to the call control service capability server and the user will continue his interaction with the application 39.

For the arrangement and configuration shown in FIG. 1, the process flow diagram in FIG. 2 can be used in all cases where more than one service capability server is required to provide a service. The main principle behind the idea, is the direct interaction between both service capability servers. Due to this direct interaction, the telecommunications infrastructure will be transparent to elements outside the network, such as the application server, the user and the media server.

It will be appreciated that numerous modifications and variations of the present invention are possible in the light of the above teachings. It is therefor understood that within the scope of the amended claims, the invention may be practised otherwise than as specifically described herein.

The invention claimed is:

1. A method of service provisioning in a telecommunications system comprising a configuration of service switching points (SSP), service capability servers (SCS) and service provisioning equipment, the configuration used to provide services to the User terminal, wherein at least one service requires more than one service capability server, the method comprising the steps of:

responsive to a request from a user for user interaction, an application on an Application server requesting a call control service capability server (CCSCS), to set up a connection between the user and the service provisioning equipment using a User Interaction Service Capability Server (UISCS); and on instructions from the UISCS, when the user interaction is complete, the CCSCS terminating the connection towards the service provisioning equipment.

2. The method according to claim 1, wherein said interaction sequence comprises exchanging of instructions for establishing or disconnecting a communication link between the user and the service provisioning equipment.

3. The method according to claim 2, wherein prior to the requesting step the UISCS instructing said service provisioning equipment to reserve at least one communication port for establishing said communication link.

4. The method according to claim 2, wherein following execution of the requesting step:

the CCSCS instructing a Service Switching Point (SSP) to establish a connection to the service provisioning equipment, wherein the establishment of a communication link between the user and the telecommunications system is triggered by the CCSCS instructions;

reporting, incoming call to the UISCS by one of the service provisioning equipment involved in the established communication link;

the UISCS instructing the service provisioning equipment, to perform an interaction sequence with the user; and the service provisioning equipment reporting the user interaction result to the UISCS.

5. The method according to claim 2, wherein said establishing of a communication link is the establishing of a speech channel.

6. The method according to claim 2, further comprising:

reporting the establishment of said communication link to one of the service capability servers involved in the provisioning of service.

7. The method according to claim 2, further comprising:

upon receiving results of the user interaction, the application on the application server instructing the UISCS to close the connection between the user and the provisioning service equipment.

8. The method according to claim 1, wherein said service provisioning equipment comprises:

a resource server, such as a media server, and wherein said interaction between said service capability servers triggers the setup and disconnection of the communication link between the user and said resource server.

9. An arrangement for the provisioning of services via a telecommunications network, the arrangement comprising:

at least two service switching points (SSP) for setting up communications connections between users and service provisioning equipment;

at least two service capability servers (SCS) for providing services to the users, the at least two SCSs comprising a call control service capability server (CCSCS) and a user interaction service capability server (UISCS), wherein the CCSCS, passes a request for a user interaction sequence to an application running on an application server, the application. server managing the at least two service capability servers; and the UISCS being instructed to reserve a port on the service provisioning equipment to perform the user interaction sequence, inform the application of the port reservation, notify the CCSCS of the service provisioning equipment location and instruct the CCSCS to connect the user to the service provisioning equipment via the at least two service switching points and when the user interaction is complete the UISCS instructing the CCSCS to terminate the connection to the port on the service provisioning equipment.

10. The arrangement according to claim 9, wherein the telecommunication system is a universal mobile telecommunications system (UMTS).

11. The arrangement according to claim 9, wherein said instructions trigger the establishing of a communication link between a user and the service provisioning equipment of said telecommunications system.

12. The arrangement according to 11 wherein the establishing of a communication link is the establishing of a speech channel.

13. A method of service provisioning in a telecommunications system comprising a configuration of service switching points (SSP), service capability servers (SCS) and service provisioning equipment, a User terminal connected to a first SSP and a first SCS, and a media device connected to a second SSP, a first and second SCS and an Application, the configuration used to provide services to the User terminal, wherein at least one service requires more than one service capability server, the method comprising the steps of:

the User invoking the Application via the first SSP and the first SCS, a Call Control Service Capability Server (CCSCS), wherein the Application initiates the second SCS for required user interaction;

the second SCS, a User Interaction Service Capability Server (UISCS) initiating the media device and requesting the first SCS to set up the User in the first SSP to the media device connection in the second SSP;

upon completing the user interaction, the second SCS requesting the first SCS to disconnect the user and the media device; and the first SCS terminating the user connection between the first SSP and the second SSP.

* * * * *

UNITED STATES PATENT AND TRADEMARK OFFICE
CERTIFICATE OF CORRECTION

| | | |
|---|---|---|
| PATENT NO. | : 7,860,080 B2 | Page 1 of 1 |
| APPLICATION NO. | : 10/506747 | |
| DATED | : December 28, 2010 | |
| INVENTOR(S) | : Yuzhang | |

It is certified that error appears in the above-identified patent and that said Letters Patent is hereby corrected as shown below:

In Column 7, Line 23, in Claim 4, delete "reporting," and insert -- reporting --, therefor.

In Column 7, Line 26, in Claim 4, delete "equipment," and insert -- equipment --, therefor.

In Column 8, Line 7, in Claim 9, delete "application." and insert -- application --, therefor.

In Column 8, Line 28, in Claim 12, delete "11" and insert -- claim 11, --, therefor.

Signed and Sealed this
Thirty-first Day of May, 2011

David J. Kappos
*Director of the United States Patent and Trademark Office*